(12) United States Patent
Sasaki et al.

(10) Patent No.: US 9,151,016 B2
(45) Date of Patent: Oct. 6, 2015

(54) OPERATOR PROTECTIVE GUARD, GUARD-EQUIPPED CAB FOR WORK MACHINE, AND WORK MACHINE

(71) Applicant: KOMATSU LTD., Tokyo (JP)

(72) Inventors: Makoto Sasaki, Takatsuki (JP); Masahiro Nagano, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/004,966

(22) PCT Filed: Mar. 29, 2013

(86) PCT No.: PCT/JP2013/059490
§ 371 (c)(1),
(2) Date: Sep. 13, 2013

(87) PCT Pub. No.: WO2014/155659
PCT Pub. Date: Oct. 2, 2014

(65) Prior Publication Data
US 2014/0292032 A1 Oct. 2, 2014

(51) Int. Cl.
*B60R 21/11* (2006.01)
*E02F 9/16* (2006.01)

(52) U.S. Cl.
CPC .............. *E02F 9/163* (2013.01); *B60R 21/11* (2013.01)

(58) Field of Classification Search
CPC ...... B60R 21/11; B60R 21/13; B60R 21/131; E02F 9/163
USPC ................ 296/1.04, 187.13, 190.01, 190.03, 296/190.08; 280/784
See application file for complete search history.

(56) References Cited

U.S. PATENT DOCUMENTS 7,131,686 B1 * 11/2006 Jo et al. ................... 296/190.03

FOREIGN PATENT DOCUMENTS

| JP | 54060737 A | * | 5/1979 |
| JP | 2517641 Y2 | | 11/1996 |
| JP | 2544772 Y2 | | 8/1997 |
| JP | 2007-063839 A | | 3/2007 |
| JP | 2007-154477 A | | 6/2007 |
| JP | 2012-012837 A | | 1/2012 |

OTHER PUBLICATIONS

Journal of Technical Disclosure No. 2001-6578, Published by the Japan Institute of Invention and Innovation, Dec. 17, 2001, including comments regarding relevance.

* cited by examiner

*Primary Examiner* — Jason S Daniels
(74) *Attorney, Agent, or Firm* — Drinker Biddle & Reath LLP (57) ABSTRACT

An operator protective guard which can ensure strength and is easily manufactured and assembled is provided. A front guard includes a plurality of first plate members and second plate members each made of one plate. The first plate members and the second plate members are assembled in a grid pattern such that a first longitudinal direction of each of the first plate members intersects with a second longitudinal direction of each of the second plate members. The plurality of the first plate members are arranged radially as seen in the longitudinal direction. The plurality of the second plate members are arranged radially as seen in the longitudinal direction. A slit is formed in the first plate member, and the second plate member is fitted in the slit and fixed by welding.

10 Claims, 10 Drawing Sheets

OPERATOR PROTECTIVE GUARD, GUARD-EQUIPPED CAB FOR WORK MACHINE, AND WORK MACHINE

TECHNICAL FIELD

The present invention relates to an operator protective guard, a guard-equipped cab for a work machine, and a work machine.

BACKGROUND ART

A work machine such as a hydraulic excavator or a scrap loader includes a cab in which an operator operating the work machine rides. The cab for the work machine is equipped with an operator protective guard for appropriately protecting the operator against vandals flying from the front of or above the cab to the cab. A conventional operator protective guard is disclosed, for example, in Japanese Patent Laying-Open No. 2007-154477 (PTD 1). A front guard disclosed in this document is constructed by assembling a screen body to a front surface of a mounting frame body. The screen body has a metal screen, and the metal screen is formed by arranging a plurality of steel wires parallel to one another to intersect with one another in vertical and horizontal directions.

On the other hand, there has been proposed a technique for ensuring a field of vision from an operator seat by arranging members mounted on the periphery of a cab for a work machine to be parallel to a line of vision of an operator riding in the cab (see, for example, Japanese Patent Laying-Open No. 2007-63839 (PTD 2), and Journal of Technical Disclosure No. 2001-6578 published by the Japan Institute of Invention and Innovation (NPD 1)). Each member is arranged at an angle with respect to a front-rear direction of the cab or a horizontal direction, and the angle varies as appropriate in accordance with the orientation of the line of vision of the operator.

CITATION LIST

Patent Document

PTD 1: Japanese Patent Laying-Open No. 2007-154477
PTD 2: Japanese Patent Laying-Open No. 2007-63839

Non Patent Document

NPD 1: Journal of Technical Disclosure No. 2001-6578 published by the Japan Institute of Invention and Innovation

SUMMARY OF INVENTION

Technical Problem

In the case of the operator protective guard constructed by the screen body disclosed in Japanese Patent Laying-Open No. 2007-154477 (PTD 1), it is necessary to increase the diameter of the steel wires in order to improve strength of the operator protective guard. When the diameter of the steel wires is increased, a field of vision of an operator is obstructed by the steel wires, deteriorating visibility from an operator seat.

By combining elongated plate-like members in a grid pattern to form an operator protective guard, and arranging the plate-like members such that a width direction of each plate extends along a direction of a line of vision of an operator and a thickness direction of each plate extends along a right-left direction of a cab for a work machine, the strength of the operator protective guard can be improved, and a field of vision from an operator seat can also be ensured. However, when an attempt is made to arrange each of the plate-like members combined in a grid pattern to be parallel to the line of vision of the operator, manufacturing and assembly of the operator protective guard become difficult. Although the plate-like members can be assembled by dividing one of the plate-like members intersecting in vertical and horizontal directions in a longitudinal direction, productivity of the operator protective guard is significantly deteriorated in this case.

The present invention has been made in view of the aforementioned problem, and a main object of the present invention is to provide an operator protective guard which has a required strength, can ensure good visibility from an operator seat, and is easily manufactured and assembled. Further, another object of the present invention is to provide a guard-equipped cab for a work machine including the operator protective guard, and a work machine including the guard-equipped cab for the work machine.

Solution to Problem

An operator protective guard in accordance with the present invention includes a plurality of first plate members each made of one plate, and a plurality of second plate members each made of one plate. The plurality of the first plate members and the plurality of the second plate members are assembled in a grid pattern such that a first longitudinal direction of each of the plurality of the first plate members intersects with a second longitudinal direction of each of the plurality of the second plate members. At least two of the plurality of the first plate members are arranged radially as seen in the first longitudinal direction. At least two of the plurality of the second plate members are arranged radially as seen in the second longitudinal direction. A slit is formed in an only one plate member of either the first plate member or the second plate member. The other plate member of the first plate member and the second plate member is fitted in the slit and fixed by welding.

According to the present invention, by assembling the plate members in a grid pattern, strength of the operator protective guard can be improved. By radially arranging the first plate members and the second plate members, the operator protective guard can be suppressed from obstructing a field of vision of an operator, and good visibility can be ensured. Further, since the first plate members and the second plate members are easily manufactured and assembled, workability in manufacturing the operator protective guard can be improved.

In the above operator protective guard, a dimension of the slit along the longitudinal direction of one plate member is larger than a thickness of the other plate member fitted in the slit. With such a configuration, the other plate member can be easily fitted in the slit, and workability in manufacturing the operator protective guard can be improved.

In the above operator protective guard, the slit has a portion in which a dimension of the slit along the longitudinal direction of one plate member increases up to an open end of the slit. With such a configuration, the other plate member can be easily fitted in the slit, and workability in manufacturing the operator protective guard can be improved.

In the above operator protective guard, the plurality of the first plate members are arranged symmetrically with respect to a plane intersecting with the second longitudinal direction. Thereby, a good field of vision of the operator can be ensured.

In the above operator protective guard, the plurality of the first plate members are provided in an even number. In this case, the first plate member is easily avoided from being arranged in front of the operator, and the field of vision of the operator can be further widened.

In the above operator protective guard, the plurality of the second plate members include a plurality of one side plate members located on one side in the first longitudinal direction, and a plurality of the other side plate members located on the other side in the first longitudinal direction. An interval between the plurality of one side plate members is smaller than an interval between the plurality of the other side plate members. With such a configuration, an operator protective guard which can be suppressed from coming into contact with the legs of the operator when it is hit by flying vandals, and can also ensure a good field of vision can be achieved.

The above operator protective guard further includes a frame member surrounding the plurality of the first plate members and the plurality of the second plate members assembled in the grid pattern. With such a configuration, the strength of the operator protective guard can be further improved, and workability in manufacturing the operator protective guard can be further improved.

A guard-equipped cab for a work machine in accordance with the present invention includes a cab for a work machine in which an operator operating the work machine rides, and any operator protective guard described above provided on at least one of a front side and a ceiling side of the cab for the work machine. Thus, a guard-equipped cab for a work machine including an operator protective guard which is highly strong, can obtain a good field of vision, and is excellent in manufacturing workability can be provided.

In the above guard-equipped cab for the work machine, the first plate members are arranged symmetrically with respect to a center line of the cab for the work machine in a right-left direction of the cab for the work machine. Thereby, a wider field of vision of the operator can be ensured.

The above guard-equipped cab for the work machine further includes an operator seat which is accommodated in an internal space of the cab for the work machine and in which the operator sits. The first plate members are arranged symmetrically with respect to a center line of the operator seat in a right-left direction of the cab for the work machine. Thereby, a wider field of vision of the operator can be ensured.

A work machine in accordance with the present invention includes any guard-equipped cab for a work machine described above. Thus, a work machine including an operator protective guard which is highly strong, can obtain a good field of vision, and is excellent in manufacturing workability can be provided.

Advantageous Effects of Invention

As described above, according to the present invention, an operator protective guard which can ensure strength and good visibility and is also easily manufactured and assembled can be achieved.

DESCRIPTION OF EMBODIMENTS

Hereinafter, embodiments of the present invention will be described with reference to the drawings.

Embodiment 1

Firstly, a configuration of a work machine in one embodiment of the present invention will be described. Although a hydraulic excavator as one example of a work machine to which the concept of the present invention is applicable will be described below, the present invention is applicable to a work machine including a cab for the work machine.

Figure 1:
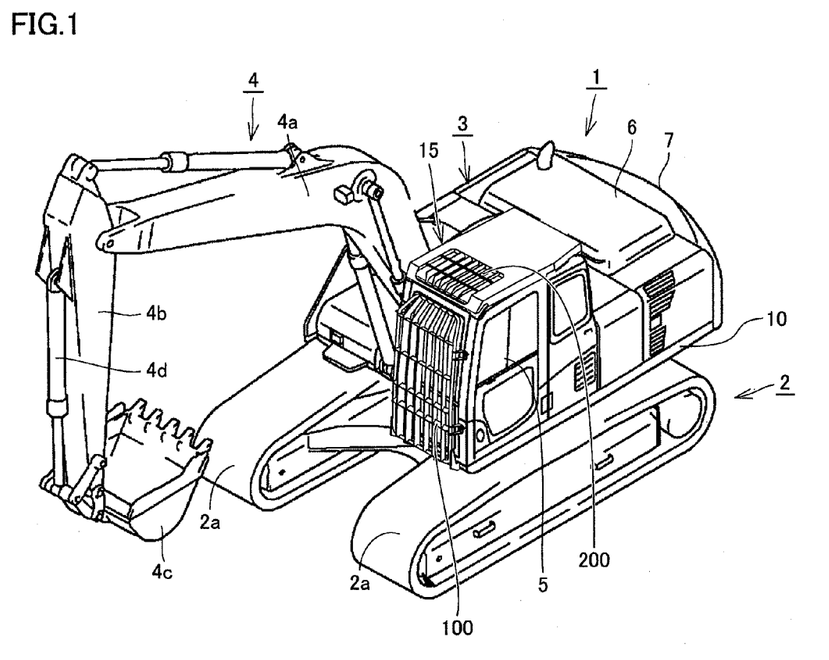
FIG. 1 is a perspective view schematically showing a configuration of a work machine in one embodiment of the present invention.

FIG. 1 is a perspective view schematically showing a configuration of a hydraulic excavator 1 as a work machine in one embodiment of the present invention. Referring to FIG. 1, hydraulic excavator 1 mainly includes a travel base structure 2, a revolving superstructure 3, a work implement 4, and a guard-equipped cab 15 of the work machine. Travel base structure 2 and revolving superstructure 3 mainly constitute a main body of the work machine.

Travel base structure 2 has a pair of right and left crawler belts 2a. Travel base structure 2 is configured to allow self-propelling by rotating the pair of crawler belts 2a. Revolving superstructure 3 is mounted revolvably with respect to travel base structure 2.

Revolving superstructure 3 includes a cab 5 for the work machine as a space for an operator to operate hydraulic excavator 1, on a front left side. Revolving superstructure 3 includes an engine compartment 6 accommodating an engine, and a counterweight 7, on a rear side. It is noted that, in the present embodiment, with the operator sitting inside cab 5 for the work machine, a front side of the operator is defined as a front side of revolving superstructure 3, a side opposite to the front side, that is, a rear side of the operator, is defined as a rear side of revolving superstructure 3, a left side of the sitting operator is defined as a left side of revolving superstructure 3, and a right side of the sitting operator is defined as a right side of revolving superstructure 3. It is hereinafter assumed that the front, rear, left, and right of revolving superstructure 3 correspond to the front, rear, left, and right of the work machine.

Revolving superstructure 3 includes a revolving frame 10. Revolving frame 10 is included in the main body of the work machine. Revolving frame 10 is arranged above travel base structure 2, and is provided to be revolvable in an arbitrary direction with respect to travel base structure 2. Work implement 4, guard-equipped cab 15 for the work machine, and counterweight 7 are mounted on revolving frame 10 and arranged on an upper surface of revolving frame 10.

Work implement 4 for performing an operation such as soil excavation is pivotally supported by revolving superstructure 3 to be swingable in an up-down direction. Work implement 4 has a boom 4a mounted to a substantially central portion of the front side of revolving superstructure 3 to be swingable upward/downward, an arm 4b mounted to a distal end portion of boom 4a to be swingable forward/rearward, and a bucket 4c mounted to a distal end portion of arm 4b to be swingable forward/rearward. Boom 4a, arm 4b, and bucket 4c are each configured to be swingably actuated by hydraulic cylinders 4d.

Guard-equipped cab 15 for the work machine is arranged on the front left side of revolving superstructure 3. Work implement 4 is provided on the right side with respect to guard-equipped cab 15 for the work machine, which is the side of one side portion of guard-equipped cab 15 for the work machine. It is noted that the arrangement of guard-equipped cab 15 for the work machine and work implement 4 is not limited to the example shown in FIG. 1, and for example, work implement 4 may be provided on the left side of guard-equipped cab 15 for the work machine arranged on the front right side of revolving superstructure 3.

Figure 2:
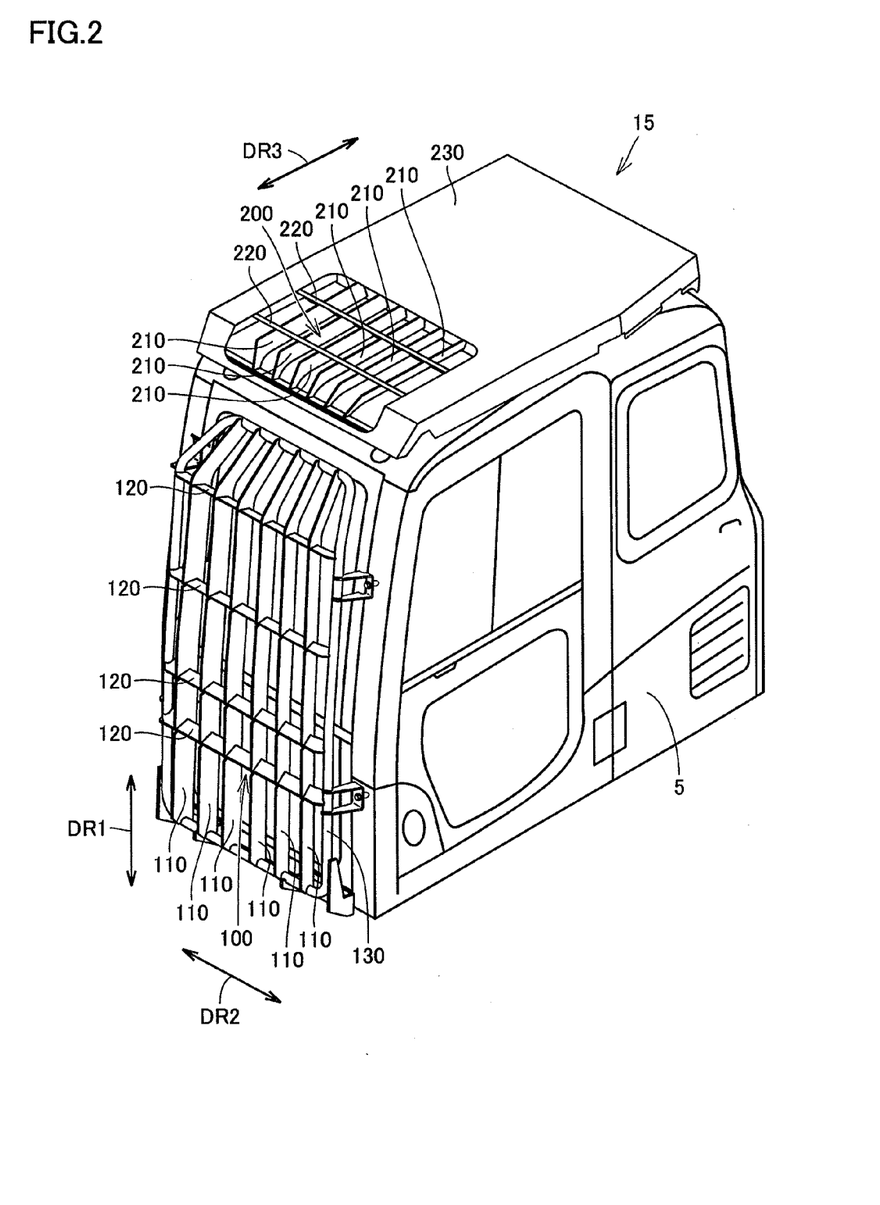
FIG. 2 is a perspective view schematically showing a configuration of a guard-equipped cab for the work machine in one embodiment of the present invention.

FIG. 2 is a perspective view schematically showing a configuration of guard-equipped cab 15 for the work machine in one embodiment of the present invention. Referring to FIG. 2, guard-equipped cab 15 for the work machine includes cab 5 for the work machine in which the operator operating hydraulic excavator 1 rides, and an operator protective guard protecting the operator. The operator protective guard includes a front guard 100 and a top guard 200. Front guard 100 and top guard 200 are mounted on cab 5 for the work machine. Front guard 100 is provided on a front side of cab 5 for the work machine for the purpose of protecting the operator against flying vandals from the front of cab 5 for the work machine. Top guard 200 is provided on a ceiling side of cab 5 for the work machine for the purpose of protecting the operator against falling vandals from above cab 5 for the work machine.

Front guard 100 includes a plurality of first plate members 110 and a plurality of second plate members 120. Each first plate member 110 is formed of one plate. Each second plate member 120 is formed of one plate. Front guard 100 has a configuration in which the plurality of first plate members 110 and the plurality of second plate members 120 are assembled in a grid pattern such that a longitudinal direction DR1 of each of the plurality of first plate members 110 intersects with a longitudinal direction DR2 of each of the plurality of second plate members 120.

A frame 130 as a frame member is provided to surround a grid formed by the plurality of first plate members 110 and the plurality of second plate members 120. The periphery of the grid is supported by frame 130. Front guard 100 further includes frame 130 surrounding the plurality of first plate members 110 and the plurality of second plate members 120 assembled in the grid pattern. Frame 130 is formed by bending and deforming a pipe into a predetermined shape and coupling the pipe as appropriate. The plurality of first plate members 110 and the plurality of second plate members 120 are mounted on a surface on the front side of cab 5 for the work machine, with frame 130 interposed therebetween.

Top guard 200 includes a plurality of first plate members 210 and a plurality of second plate members 220. Each first plate member 210 is formed of one plate. Each second plate member 220 is formed of one plate. Top guard 200 has a configuration in which the plurality of first plate members 210 and the plurality of second plate members 220 are assembled in a grid pattern such that a longitudinal direction DR3 of each of the plurality of first plate members 210 intersects with longitudinal direction DR2 of each of the plurality of second plate members 220.

A frame 230 as a frame member is provided to surround a grid formed by the plurality of first plate members 210 and the plurality of second plate members 220. The periphery of the grid is supported by frame 230. Top guard 200 further includes frame 230 surrounding the plurality of first plate members 210 and the plurality of second plate members 220 assembled in the grid pattern. The plurality of first plate members 210 and the plurality of second plate members 220 are mounted on a surface on an upper side of cab 5 for the work machine, with frame 230 interposed therebetween.

Longitudinal direction DR3 of first plate members 210 is a direction along a front-rear direction of the work machine. Longitudinal direction DR2 of second plate members 120, 220 is a direction along a right-left direction of the work machine. Longitudinal direction DR1 of first plate members 110 is a direction along a vertical direction.

Figure 3:
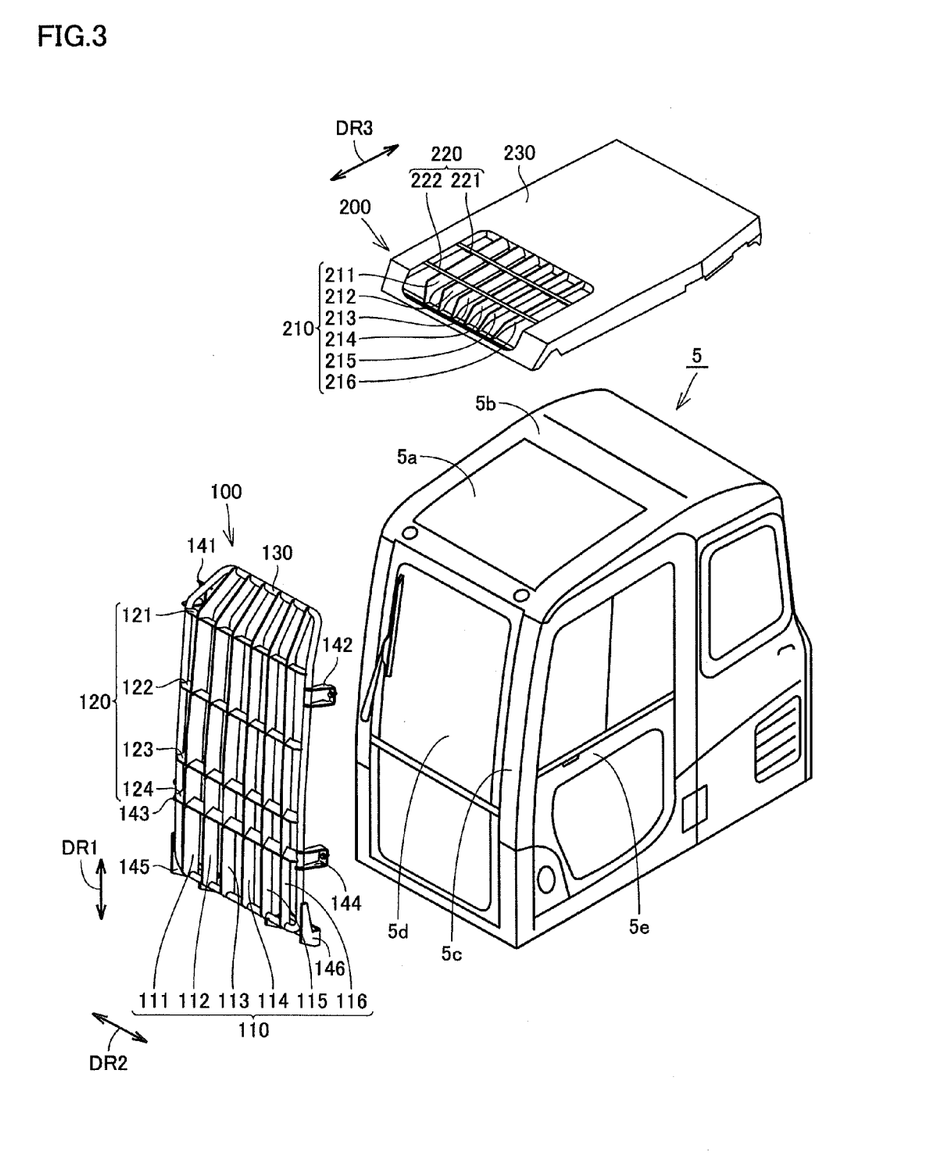
FIG. 3 is an exploded perspective view schematically showing the configuration of the guard-equipped cab for the work machine in one embodiment of the present invention.

FIG. 3 is an exploded perspective view schematically showing the configuration of guard-equipped cab 15 for the work machine in one embodiment of the present invention. Referring to FIG. 3, cab 5 for the work machine mainly has a top window 5a, a top panel 5b, pillars 5c, a front window 5d, and a door 5e. Top panel 5b is arranged at a roof portion of cab 5 for the work machine. Top window 5a is arranged on a front side of the roof portion of cab 5 for the work machine. Pillars 5c extend in the up-down direction between the roof portion and a floor portion of cab 5 for the work machine, and support the roof portion with respect to the floor portion.

Front window 5d is arranged on the front side of cab 5 for the work machine, to be sandwiched between pillar 5c on a front right side and pillar 5c on a front left side of cab 5 for the work machine. Door 5e is arranged on the left side of cab 5 for the work machine, to be sandwiched between pillar 5c on the front left side and pillar 5c on a rear left side of cab 5 for the work machine. Lower end portions of pillars 5c are welded to a floor plate not shown. It is noted that, in the present embodiment, a direction in which the floor plate extends in a state where hydraulic excavator 1 is placed on a horizontal ground will be referred to as a horizontal direction.

Front guard 100 covers front window 5d from the front side of cab 5 for the work machine. Front guard 100 is provided to appropriately protect the operator riding in cab 5 for the work machine against vandals such as stones or broken pieces flying from the front of cab 5 for the work machine. Top guard 200 covers top window 5a from the upper side of cab 5 for the work machine. Top guard 200 is provided to appropriately protect the operator riding in cab 5 for the work machine against a vandal such as a stone or a broken piece falling from above to cab 5 for the work machine.

Front guard 100 includes six first plate members 111 to 116 and four second plate members 121 to 124. The plurality of first plate members 110 are provided in an even number. The plurality of second plate members 120 are provided in an even number. Six first plate members 111 to 116 are placed in this order from the right to the left in a right-left direction of cab 5 for the work machine. Four second plate members 121 to 124 are placed in this order from top to bottom in the up-down direction.

The plurality of second plate members 120 are arranged with a relatively large interval therebetween on an upper side of first plate members 110 divided into two in the up-down direction, and are arranged with a relatively small interval therebetween on a lower side thereof. The plurality of second plate members 120 include a plurality of second plate members 123, 124 located on one side in longitudinal direction DR1 of first plate members 110, that is, on the lower side, and a plurality of second plate members 121, 122 located on the other side in longitudinal direction DR1, that is, on the upper side. The interval between second plate members 123, 124 in longitudinal direction DR1 is smaller than the interval between second plate members 121, 122.

Of the plurality of second plate members 120, two second plate members 123, 124 arranged on the lower side constitute one side plate members. Of the plurality of second plate members 120, two second plate members 121, 122 arranged on the upper side constitute the other side plate members. An interval between a plurality of one side plate members is smaller than an interval between a plurality of the other side plate members.

Top guard 200 includes six first plate members 211 to 216 and two second plate members 221, 222. The plurality of first plate members 210 are provided in an even number. The plurality of second plate members 220 are provided in an even number. Six first plate members 211 to 216 are placed in this order from the right to the left in the right-left direction of cab 5 for the work machine. Two second plate members 221, 222 are placed in this order from rear to front in a front-rear direction of cab 5 for the work machine.

A plurality of fixed portions 141 to 146 are provided at frame 130 of front guard 100. Front guard 100 is fixed to cab 5 for the work machine by fixing fixed portions 141, 143, and 145 to right pillar 5c of a pair of pillars 5c on the front side of cab 5 for the work machine, and fixing fixed portions 142, 144, and 146 to left pillar 5c thereof. Fixed portions 141 to 146 are fixed to pillars 5c of cab 5 for the work machine by the action of threads using bolts.

Figure 4:
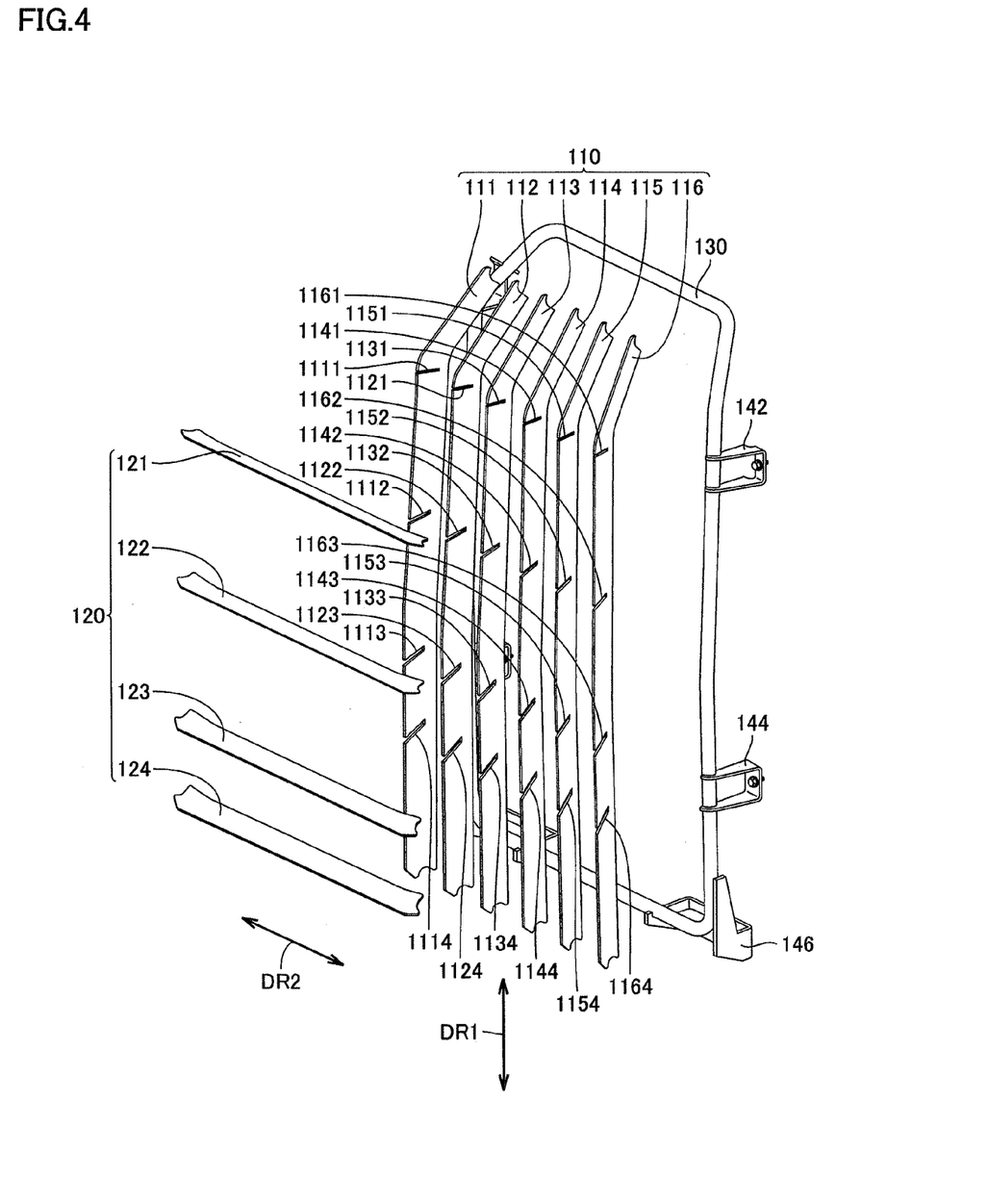
FIG. 4 is an exploded perspective view schematically showing a configuration of a front guard.

FIG. 4 is an exploded perspective view schematically showing a configuration of front guard 100. Referring to FIG. 4, a plurality of slits 1111 to 1114 are formed in first plate member 111 constituting a portion of front guard 100. Slits 1111 to 1114 are formed to penetrate first plate member 111 having the shape of an elongated, substantially flat plate, in a thickness direction thereof. Slits 1111 to 1114 are formed by partially cutting first plate member 111 from an end portion on a front side of first plate member 111. Slits 1111 to 1114 each have a bottomed shape. Namely, slits 1111 to 1114 are formed to have a shape not penetrating first plate member 111 in the front-rear direction of cab 5 for the work machine.

Slits 1121 to 1124 similar to those in first plate member 111 are formed in first plate member 112. Slits 1131 to 1134 similar to those in first plate member 111 are formed in first plate member 113. Slits 1141 to 1144 similar to those in first plate member 111 are formed in first plate member 114. Slits 1151 to 1154 similar to those in first plate member 111 are formed in first plate member 115. Slits 1161 to 1164 similar to those in first plate member 111 are formed in first plate member 116.

Unlike first plate members 111 to 116, no slits are formed in second plate members 121 to 124. Slits are formed in only one plate member of first plate member 110 and second plate member 120 constituting front guard 100, and no slits are formed in the other plate member thereof. First plate member 110 and second plate member 120 are integrally assembled by forming a slit in one plate member of first plate member 110 and second plate member 120 and fitting the other plate member thereof in the slit.

In longitudinal direction DR1 of each of first plate members 111 to 116, slit 1111, 1121, 1131, 1141, 1151, 1161 is formed at a corresponding position. Slits 1111, 1121, 1131, 1141, 1151, and 1161 formed in first plate members 111 to 116, respectively, are formed at positions which are substantially identical in longitudinal direction DR1. Thereby, second plate member 121 can be accommodated in slits 1111, 1121, 1131, 1141, 1151, and 1161 over a plurality of first plate members 111 to 116. Second plate member 121 is integrally fixed to first plate members 111 to 116 by being fitted in each of slits 1111, 1121, 1131, 1141, 1151, and 1161 and thereafter being welded.

Similarly, slits 1112, 1122, 1132, 1142, 1152, and 1162 formed in first plate members 111 to 116, respectively, are formed at positions which are substantially identical in longitudinal direction DR1. Second plate member 122 is integrally fixed to first plate members 111 to 116 by being fitted in each of slits 1112, 1122, 1132, 1142, 1152, and 1162 and thereafter being welded.

Similarly, slits 1113, 1123, 1133, 1143, 1153, and 1163 formed in first plate members 111 to 116, respectively, are formed at positions which are substantially identical in longitudinal direction DR1. Second plate member 123 is integrally fixed to first plate members 111 to 116 by being fitted in each of slits 1113, 1123, 1133, 1143, 1153, and 1163 and thereafter being welded.

Similarly, slits 1114, 1124, 1134, 1144, 1154, and 1164 formed in first plate members 111 to 116, respectively, are formed at positions which are substantially identical in longitudinal direction DR1. Second plate member 124 is integrally fixed to first plate members 111 to 116 by being fitted in each of slits 1114, 1124, 1134, 1144, 1154, and 1164 and thereafter being welded.

The plurality of first plate members 110 and the plurality of second plate members 120 form a grid frame body by fitting second plate members 120 in the slits formed in first plate members 110 to integrate them with each other. The plurality of first plate members 110 are fixed using a jig to position each of them, and thereafter the work of fitting second plate members 120 in the slits is performed. Thereby, first plate members 110 and second plate members 120 are assembled with each other at precise positions. Thereafter, intersecting portions of first plate members 110 and second plate members 120 are welded, thus forming a grid shape having first plate members 110 and second plate members 120 fixed integrally.

Figure 5:
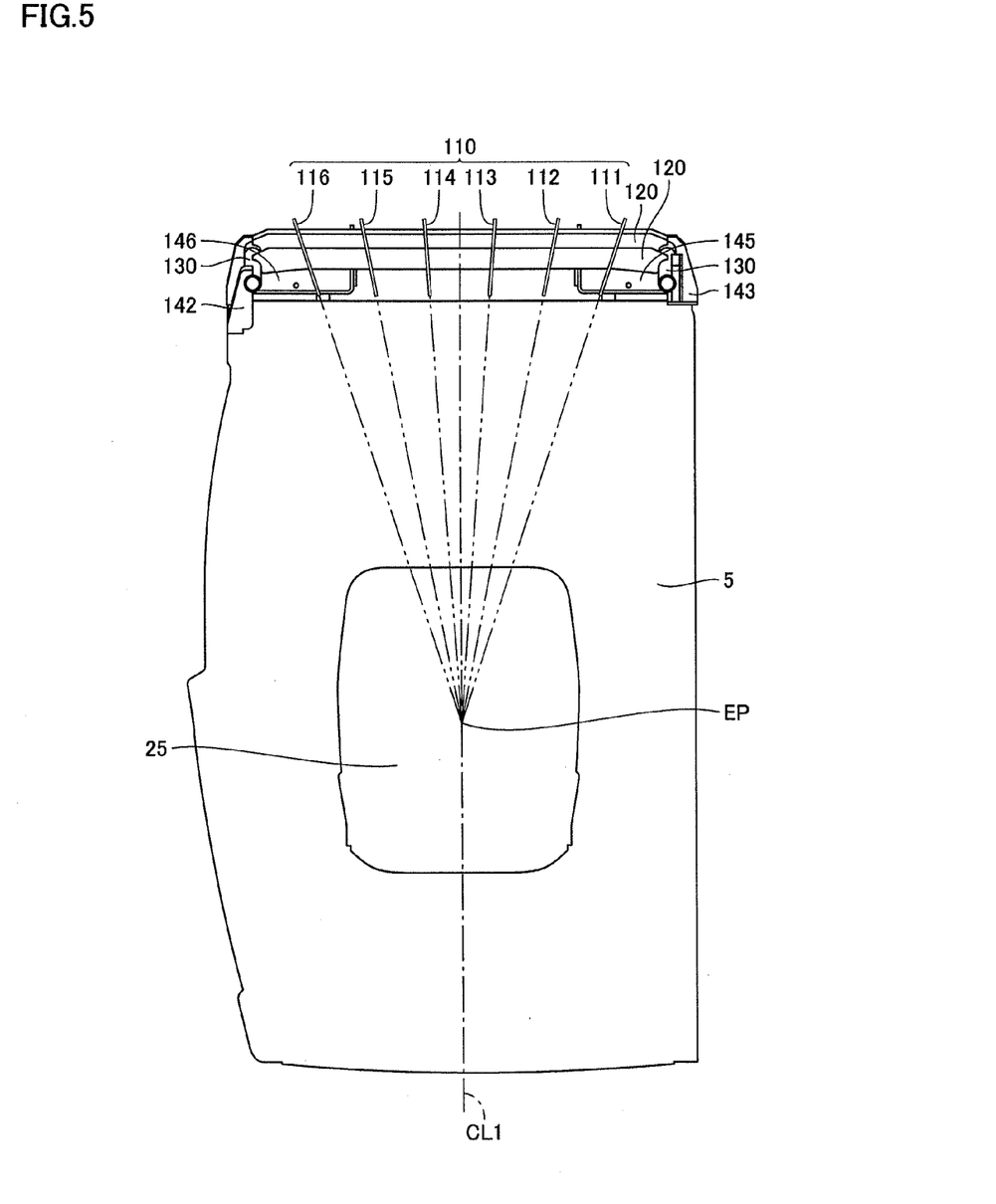
FIG. 5 is a schematic view showing a horizontal cross section of the guard-equipped cab for the work machine.

FIG. 5 is a schematic view showing a horizontal cross section of guard-equipped cab 15 for the work machine. FIG. 5 shows a cross section of guard-equipped cab 15 for the work machine as seen from an upper side to a lower side. The plurality of first plate members 110 of front guard 100 extend in the up-down direction, and first longitudinal direction DR1 of each of first plate members 110 is a direction along the up-down direction. FIG. 5 shows cab 5 for the work machine and front guard 100 as seen from the upper side which is one side in first longitudinal direction DR1 to the lower side which is the other side in first longitudinal direction DR1.

Referring to FIG. 5, an operator seat 25 for the operator to sit is accommodated in an internal space of cab 5 of the work machine. The plurality of first plate members 110, i.e., first plate members 111 to 116, of front guard 100 are arranged radially about an eye point EP of the operator sitting in operator seat 25, as seen in the longitudinal direction from the upper side to the lower side. Specifically, plate-like first plate members 111 to 116 are arranged to be inclined with respect to the front-rear direction of cab 5 for the work machine and to be parallel to a line of vision of the operator, in order to be suppressed from obstructing a field of vision of the operator. First plate members 111 to 116 are arranged at angles with respect to the front-rear direction of cab 5 for the work machine such that each interval between the members gradually increases with distance from cab 5 for the work machine.

A center line CL1 indicated by an alternate long and short dash line in FIG. 5 represents a center line of cab 5 for the work machine in the right-left direction of cab 5 for the work machine. Center line CL1 intersects with second longitudinal direction DR2 of second plate member 120. First plate members 110 of front guard 100 are arranged symmetrically with respect to center line CL1. Specifically, first plate members 110 in an even number form pairs, and first plate members 111, 116 are arranged symmetrically with respect to center line CL1, first plate members 112, 115 are arranged symmetrically with respect to center line CL1, and first plate members 113, 114 are arranged symmetrically with respect to center line CL1.

Inclination angles of first plate members 111 to 116 with respect to the front-rear direction of cab 5 for the work machine are set in accordance with the orientation of the line of vision of the operator. With respect to center line CL1 extending along the front-rear direction of cab 5 for the work machine shown in FIG. 5, first plate members 113, 114, first plate members 112, 115, and first plate members 111, 116 are inclined at angles increasing in this order. Specifically, first plate member 113, 114 and center line CL1 form a relatively small angle therebetween, first plate member 111, 116 and center line CL1 form a relatively large angle therebetween, and first plate member 112, 115 and center line CL1 form an intermediate angle therebetween.

Each of the plurality of first plate members 110 is formed to have the shape of a flat plate. In the horizontal cross section shown in FIG. 5, first plate member 110 has a dimension in the front-rear direction of cab 5 for the work machine which is larger than its dimension in the right-left direction thereof. By forming and arranging first plate members 110 as described above, improved strength of front guard 100 and ensuring of the field of vision when the operator looks forward from the inside of cab 5 for the work machine are achieved.

As shown in FIG. 5, each first plate member 110 has a longitudinal direction and a short direction in a cross sectional shape intersecting with second longitudinal direction DR2. The short direction is a thickness direction of first plate member 110. First plate member 110 is arranged such that the longitudinal direction in the cross sectional shape, i.e., a width direction of first plate member 110, extends along a radial direction about eye point EP.

Figure 6:
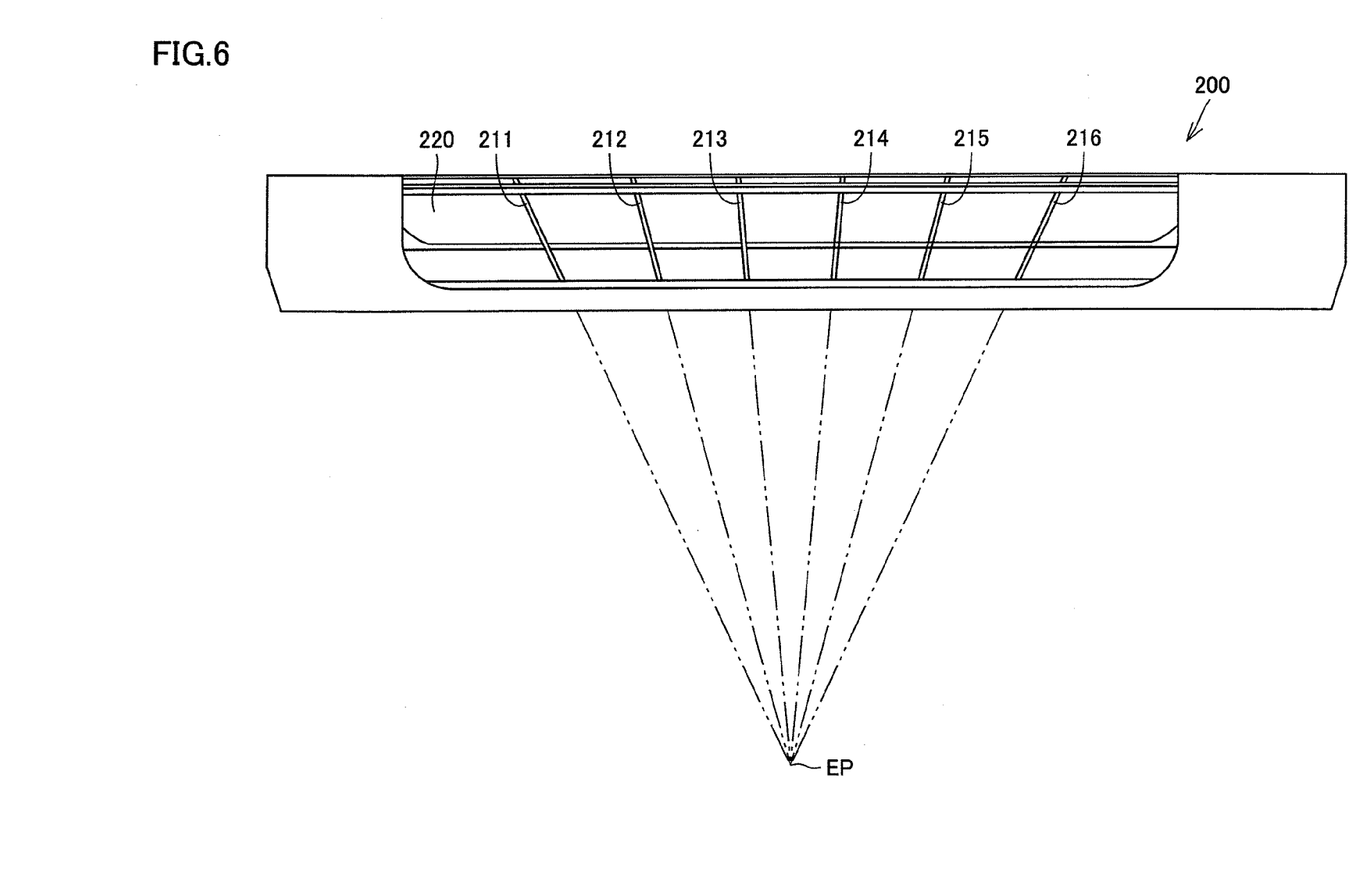
FIG. 6 is a front view schematically showing a configuration of a top guard.

FIG. 6 is a front view schematically showing a configuration of top guard 200. The plurality of first plate members 210 of top guard 200 extend in the front-rear direction of cab 5 for the work machine, and first longitudinal direction DR3 of each of first plate members 210 is a direction along the front-rear direction. FIG. 6 shows top guard 200 as seen from the front side which is one side in first longitudinal direction DR3 to the rear side which is the other side in first longitudinal direction DR3.

The plurality of first plate members 210, i.e., first plate members 211 to 216, of top guard 200 are arranged radially about eye point EP as seen in the longitudinal direction from the front side to the rear side. Specifically, plate-like first plate members 211 to 216 are arranged to be inclined with respect to the up-down direction and to be parallel to the line of vision of the operator, in order not to obstruct the field of vision of the operator. First plate members 211 to 216 are arranged at angles with respect to the up-down direction such that each interval between the members gradually increases with distance from cab 5 for the work machine.

Similar to first plate members 111 to 116 of front guard 100, first plate members 211 to 216 of top guard 200 are arranged symmetrically with respect to center line CL1. Inclination angles of first plate members 211 to 216 with respect to the up-down direction are set in accordance with the orientation of the line of vision of the operator.

Each of the plurality of first plate members 210 is formed to have the shape of a flat plate. As shown in FIG. 6, first plate member 210 has a dimension in the up-down direction which is larger than its dimension in the right-left direction of cab 5 for the work machine. By forming and arranging first plate members 210 as described above, improved strength of top guard 200 and ensuring of the field of vision when the operator looks upward from the inside of cab 5 for the work machine are achieved.

As shown in FIG. 6, each first plate member 210 has a longitudinal direction and a short direction in a shape as seen in a front view. The short direction is a thickness direction of first plate member 210. First plate member 210 is arranged such that the longitudinal direction in the front view, i.e., a width direction of first plate member 210, extends along a radial direction about eye point EP.

Figure 7:
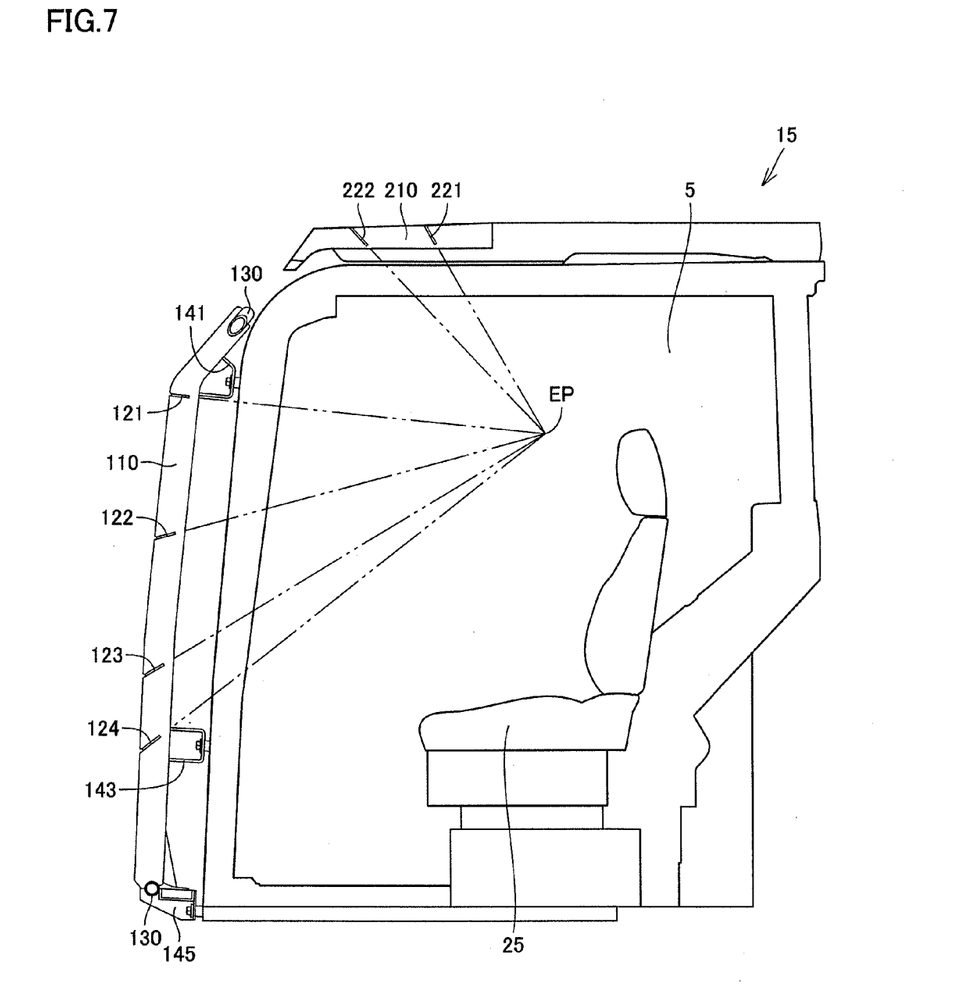
FIG. 7 is a schematic view showing a vertical cross section along a front-rear direction of the guard-equipped cab for the work machine.

FIG. 7 is a schematic view showing a vertical cross section along a front-rear direction of guard-equipped cab 15 for the work machine. The plurality of second plate members 120 of front guard 100 and the plurality of second plate members 220 of top guard 200 extend along the right-left direction of cab 5 for the work machine. Second longitudinal direction DR2 of each of second plate members 120, 220 is a direction along the right-left direction. FIG. 7 shows cab 5 for the work machine, front guard 100, and top guard 200 as seen from the left side which is one side in second longitudinal direction DR2 to the right side which is the other side in second longitudinal direction DR2.

As shown in FIG. 7, first plate member 110 of front guard 100 has a bent shape such that the proximity of its upper end portion is close to cab 5 for the work machine, in order to easily avoid interference between work implement 4 and front guard 100.

The plurality of second plate members 120, i.e., second plate members 121 to 124, of front guard 100 are arranged radially about eye point EP as seen in the longitudinal direction from the left side to the right side. The plurality of second plate members 220, i.e., second plate members 221, 222, of top guard 200 are arranged radially about eye point EP as seen in the longitudinal direction from the left side to the right side. Plate-like second plate members 121 to 124 are arranged to be inclined with respect to the horizontal direction and to be parallel to the line of vision of the operator, in order not to obstruct the field of vision of the operator. Plate-like second plate members 221, 222 are arranged to be inclined with respect to the horizontal direction and to be parallel to the line of vision of the operator, in order not to obstruct the field of vision of the operator.

Inclination angles of second plate members 121 to 124 with respect to the horizontal direction are set in accordance with the orientation of the line of vision of the operator. Second plate members 121, 122, 123, and 124 are inclined with respect to the horizontal direction at angles increasing in this order.

Inclination angles of second plate members 221 to 222 with respect to the horizontal direction are set in accordance with the orientation of the line of vision of the operator. Second plate members 221 and 222 are inclined with respect to the horizontal direction at angles increasing in this order.

Second plate members 121 to 124 are arranged at angles with respect to the horizontal direction such that each interval between the members gradually increases with distance from cab 5 for the work machine. Second plate members 221, 222 are arranged at angles with respect to the horizontal direction such that the interval between the members gradually increases with distance from cab 5 for the work machine.

Each of the plurality of second plate members 120 is formed to have the shape of a flat plate. As shown in FIG. 7, second plate member 120 has a dimension in the front-rear direction of cab 5 for the work machine which is larger than its dimension in the up-down direction. By forming and arranging second plate members 120 as described above, improved strength of front guard 100 and ensuring of the field of vision when the operator looks forward from the inside of cab 5 for the work machine are achieved.

Each of the plurality of second plate members 220 is formed to have the shape of a flat plate. As shown in FIG. 7, second plate member 220 has a dimension in the up-down direction which is larger than its dimension in the front-rear direction of cab 5 for the work machine. By forming and arranging second plate members 220 as described above, improved strength of top guard 200 and ensuring of the field of vision when the operator looks upward from the inside of cab 5 for the work machine are achieved.

As shown in FIG. 7, each of second plate members 120 (121 to 124) and 220 (221 to 222) has a longitudinal direction and a short direction in a cross sectional shape intersecting with second longitudinal direction DR2. The short direction is a thickness direction of second plate member 120, 220. Each of second plate members 120, 220 is arranged such that the longitudinal direction in the cross sectional shape, i.e., a width direction of second plate member 120, 220, extends along a radial direction about eye point EP.

Figure 8:
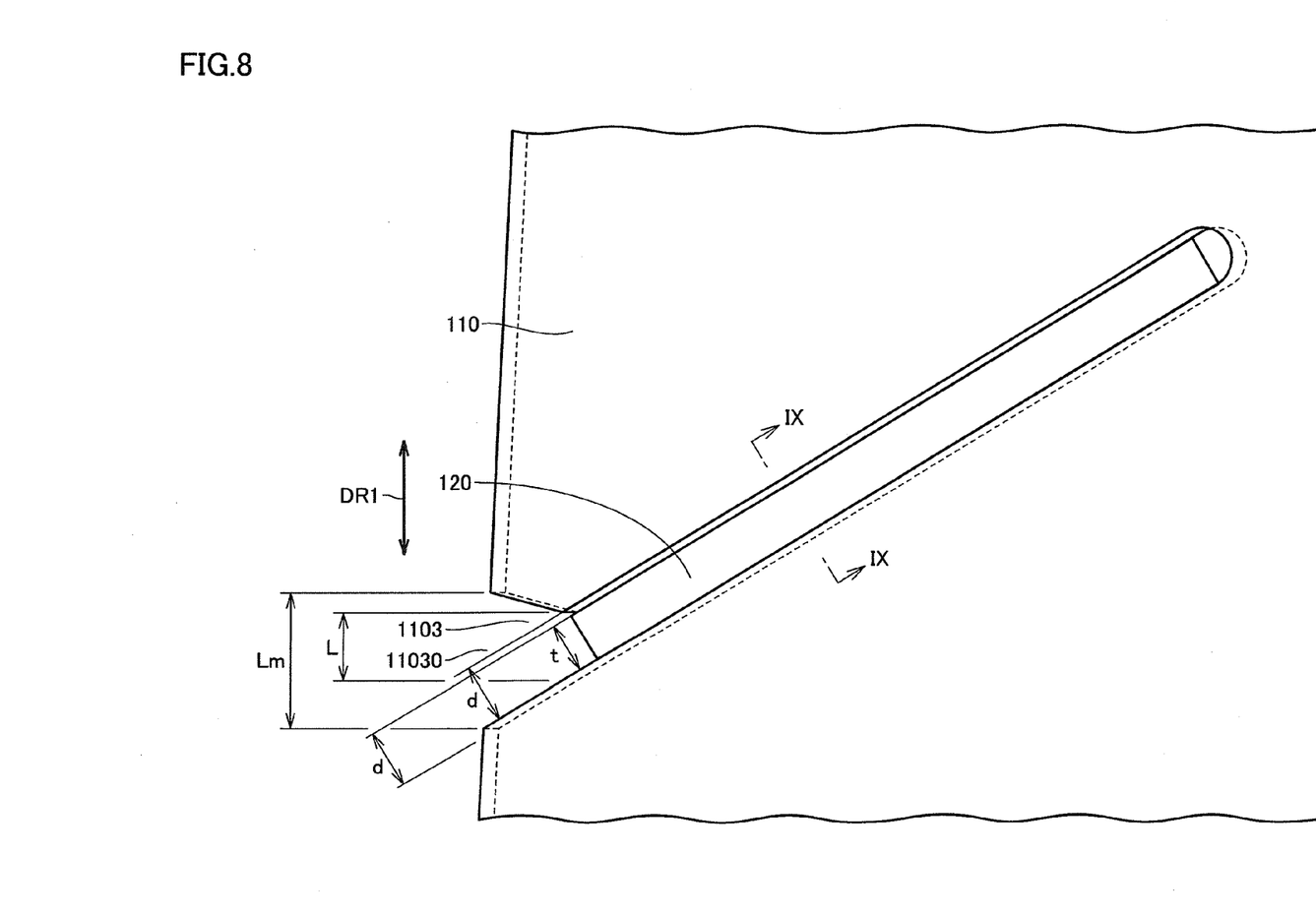
FIG. 8 is a schematic view showing a state where a plate member is fitted in a slit in an enlarged manner.

FIG. 8 is a schematic view showing a state where a plate member is fitted in a slit in an enlarged manner. FIG. 8 shows the state where a slit 1103 is formed in first plate member 110 of front guard 100, and second plate member 120 is fitted in slit 1103.

Referring to FIG. 8, slit 1103 is formed to be open in an end surface of first plate member 110. Slit 1103 is open in the end surface of first plate member 110, at an open end 11030. Slit 1103 is formed such that its dimension along first longitudinal direction DR1 of first plate member 110 gradually increases toward open end 11030, in the vicinity of open end 11030. A dimension L of slit 1103 along first longitudinal direction DR1 has a maximum value Lm at open end 11030. Slit 1103 has a portion in which its dimension along first longitudinal direction DR1 increases up to open end 11030.

Figure 9:
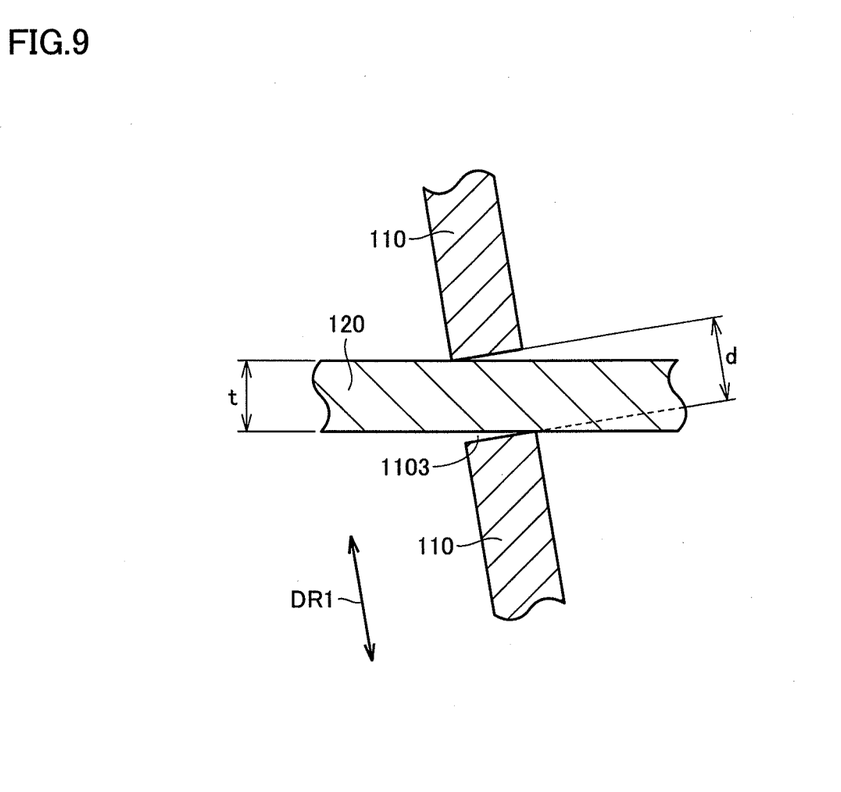
FIG. 9 is a cross sectional view taken along a line IX-IX in FIG. 8.

FIG. 9 is a cross sectional view taken along a line IX-IX in FIG. 8. Referring to FIG. 9, second plate member 120 has a thickness t. A width of slit 1103 is defined as a dimension of slit 1103 along first longitudinal direction DR1 of first plate member 110. Slit 1103 is formed such that its width has a dimension d. Dimension d of slit 1103 along first longitudinal direction DR1 is larger than thickness t of second plate member 120 fitted in slit 1103.

Next, the function and effect of the present embodiment will be described.

According to the present embodiment, as shown in FIG. 2, front guard 100 having the plurality of first plate members 110 and the plurality of second plate members 120 assembled in a grid pattern, and top guard 200 having the plurality of first plate members 210 and the plurality of second plate members 220 assembled in a grid pattern are mounted on cab 5 for the work machine. Thereby, the strength of front guard 100 and top guard 200 can be improved.

Performance requirements for evaluating characteristics of an operator protective guard are defined by ISO (International Organization for Standardization) 10262. ISO 10262 defines two acceptable standards, i.e., level I and level II. By assembling the plate members in a grid pattern to form front guard 100 and top guard 200, a highly strong operator protective guard satisfying the acceptable standard of level II defined by ISO 10262 can be achieved.

As shown in FIGS. 5 and 7, the plurality of first plate members 110 and the plurality of second plate members 120 are arranged radially about eye point EP of the operator. Thereby, the width directions of elongated plate-like first plate members 110 and second plate members 120 are arranged parallel to the line of vision of the operator, and first plate members 110 and second plate members 120 can be suppressed from obstructing the field of vision of the operator. Thus, the field of vision of the operator can be ensured.

As shown in FIG. 4, each of the plurality of first plate members 110 and second plate members 120 is formed of one plate, slits are formed in only first plate member 110, and second plate member 120 is fitted in a slit formed in first plate member 110. Front guard 100 in a grid pattern is formed by fixing first plate members 110 and second plate members 120 to each other by welding at each position where second plate member 120 is fitted in a slit in first plate member 110. This can reduce the number of parts constituting front guard 100, facilitate manufacturing of first plate member 110 and second plate member 120, and facilitate the work of integrally assembling first plate member 110 and second plate member 120. Thereby, workability in manufacturing an operator protective guard can be improved.

Further, as shown in FIG. 9, dimension d of slit 1103 along first longitudinal direction DR1 of first plate member 110 may be larger than thickness t of second plate member 120 fitted in slit 1103.

Since first plate members 110 are arranged radially as described above, the thickness direction of second plate member 120 is not perpendicular to first longitudinal direction DR1, and they are inclined with respect to each other. On this occasion, slits (for example, slits 1111, 1121, 1131, 1141, 1151, and 1161 shown in FIG. 4 in which second plate member 121 is fitted) extend in different directions. The directions in which slits 1111, 1121, 1131, 1141, 1151, and 1161 extend do not match a direction in which second plate member 121 is inserted into the slits, and are different from one another. Thus, if dimension d of slit 1103 along first longitudinal direction DR1 is set to be substantially equal to thickness t of second plate member 120, the work of fitting second plate member 120 in slit 1103 becomes difficult.

Therefore, by setting dimension d of slit 1103 along first longitudinal direction DR1 to be larger than thickness t of second plate member 120, the work of fitting second plate member 120 in slit 1103 can be further facilitated, and thus workability in manufacturing the operator protective guard can be further improved.

Further, as shown in FIG. 8, slit 1103 may have a portion in which a dimension of slit 1103 along first longitudinal direction DR1 of first plate member 110 increases up to open end 11030 of slit 1103. By forming slit 1103 to have a shape widened toward open end 11030, second plate member 120 can be fitted in slit 1103 more easily. Therefore, workability in manufacturing the operator protective guard can be further improved.

Further, as shown in FIG. 5, the plurality of first plate members 110 may be arranged symmetrically with respect to a plane intersecting with second longitudinal direction DR2 of second plate member 120. The plane intersecting with second longitudinal direction DR2 in this case is a plane including center line CL1 in the right-left direction of cab 5 for the work machine. The plurality of first plate members 110 are arranged symmetrically with respect to center line CL1 of cab 5 for the work machine in the right-left direction. By symmetrically arranging the plurality of first plate members 110, a good field of vision of the operator can be ensured.

Further, the plurality of first plate members 110 may be provided in an even number. If the plurality of first plate members 110 are provided in an odd number, central first plate member 110 of first plate members 110 placed radially may be arranged in front of the operator on the front side. When first plate member 110 is arranged in front of the operator, first plate member 110 obstructs the field of vision of the operator. Thus, by providing the plurality of first plate members 110 in an even number, first plate member 110 is easily avoided from being arranged in front of the operator, and the field of vision of the operator can be further widened.

Further, as shown in FIG. 7, the plurality of second plate members 120 include second plate members 123, 124 located on the lower side along first longitudinal direction DR1, and second plate members 121, 122 located on the upper side along first longitudinal direction DR1, and the interval between second plate members 123, 124 is smaller than the interval between second plate members 121, 122. Referring also to operator seat 25 shown in FIG. 7, second plate members 123, 124 are arranged at positions corresponding to the legs of the operator sitting in operator seat 25.

In order to satisfy the acceptable standard of level II defined by ISO 10262, it is necessary that, with a prescribed load being applied on the operator protective guard, the operator protective guard does not interfere with the operator, and the operator and the operator protective guard are not in contact with each other. Since the legs of the operator sitting in the operator seat project forward, and there is a small distance between second plate members 123, 124 and the legs of the operator, if front guard 100 is deformed, it is most likely to come into contact with the legs of the operator. By setting the interval between second plate members 123, 124 to be relatively small to relatively enhance the strength of front guard 100 at a position corresponding to the legs of the operator, front guard 100 is less likely to come into contact with the legs of the operator when it is hit by a flying vandal, and thus front guard 100 satisfying the acceptable standard of level II can be achieved.

It is noted that second plate members 121, 122 are arranged at positions corresponding to the upper body of the operator sitting in operator seat 25. There is a relatively large distance between the upper body of the operator sitting in the operator seat and second plate members 121, 122, and second plate members 121, 122 are arranged at positions away from the operator. Thus, even if front guard 100 is deformed at the positions of second plate members 121, 122 when it is hit by a flying vandal, occurrence of contact between front guard 100 and the operator can be suppressed. Therefore, even if the field of vision is further widened by increasing the distance between second plate members 121, 122, there arises no problem in terms of the strength of front guard 100, and front guard 100 satisfying the acceptable standard of level II and also obtaining a good field of vision can be achieved.

On the other hand, the plurality of first plate members 110, 210 are arranged to form substantially uniform intervals in the right-left direction of cab 5 for the work machine. Thereby, uniformity of the strength of front guard 100 and top guard 200 in the right-left direction can be improved.

Further, as shown in FIG. 2, the plurality of first plate members 110 and the plurality of second plate members 120 assembled in a grid pattern may be surrounded by frame 130. By fixing first plate members 110 and second plate members 120 to frame 130 by welding, the strength of front guard 100 can be improved. When front guard 100 is designed to be mounted on cab 5 for the work machine by fixing frame 130 with bolts, front guard 100 can be mounted on and integrated with cab 5 for the work machine more easily. In this case, by fabricating frame 130 using a pipe material, strength of frame 130 can be improved, and the strength of frame 130 required to be fixed to cab 5 for the work machine with bolts can be obtained.

Referring to FIG. 2, guard-equipped cab 15 for the work machine in the present embodiment includes cab 5 for the work machine in which the operator operating the work machine rides, and front guard 100 provided on the front side and top guard 200 provided on the ceiling side of cab 5 for the work machine. Thus, guard-equipped cab 15 for the work machine including operator protective guards 100, 200 which are highly strong, can obtain a good field of vision, and are excellent in manufacturing workability can be provided.

Referring to FIG. 1, the work machine (hydraulic excavator 1) in the present embodiment includes guard-equipped cab 15 for the work machine described above. Thus, the work machine (hydraulic excavator 1) including operator protective guards 100, 200 which are highly strong, can obtain a good field of vision, and are excellent in manufacturing workability can be provided.

Embodiment 2

Figure 10:
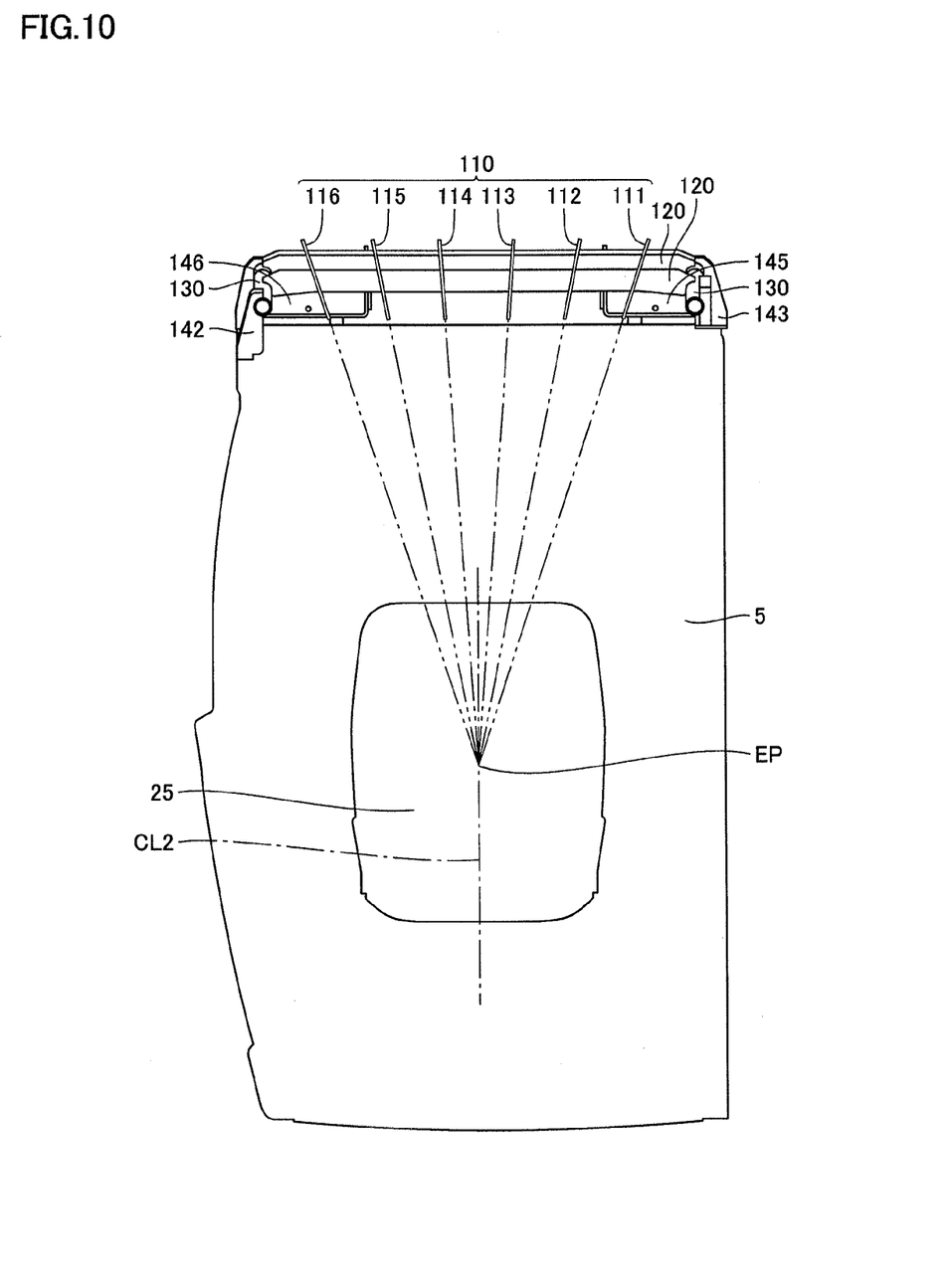
FIG. 10 is a schematic view showing a horizontal cross section of a guard-equipped cab for a work machine in Embodiment 2.

FIG. 10 is a schematic view showing a horizontal cross section of a guard-equipped cab for a work machine in Embodiment 2. Referring to FIG. 10, Embodiment 2 of the present invention is different from Embodiment 1 in the arrangement of first plate members 110 of front guard 100. Embodiment 1 has described an example where the plurality of first plate members 110 are arranged line-symmetrically with respect to center line CL1 of cab 5 for the work machine. In Embodiment 2, the plurality of first plate members 110 are arranged line-symmetrically with respect to a center line CL2 of operator seat 25 accommodated in the internal space of cab 5 for the work machine. Center line CL2 intersects with second longitudinal direction DR2 of second plate member 120.

Other than that, the configuration in the present embodiment is the same as the configuration in Embodiment 1 described above, and thus identical parts will be designated by the same reference numerals, and the description thereof will not be repeated.

Also in the present embodiment, the plurality of first plate members 110 are arranged symmetrically with respect to a plane intersecting with second longitudinal direction DR2 of second plate member 120. The plane intersecting with second longitudinal direction DR2 in this case is a plane including center line CL2 of operator seat 25 in the right-left direction of cab 5 for the work machine. With such a configuration, a wider field of vision of the operator can be ensured as in Embodiment 1.

Although the embodiments have described an example where all of the plurality of first plate members 110, 210 and the plurality of second plate members 120, 220 are arranged radially using eye point EP as a starting point, the present invention is not limited to this configuration. Namely, all of the plate members do not have to be arranged radially, and only some of the plate members may be arranged radially. For example, in the case of hydraulic excavator 1 shown in FIG. 1, only first plate members 110, 210 and second plate members 120, 220 on the right side in the right-left direction of cab 5 for the work machine may be arranged radially.

In hydraulic excavator 1 shown in FIG. 1, guard-equipped cab 15 for the work machine is arranged on the front left side of revolving superstructure 3, and work implement 4 is arranged on the right side with respect to guard-equipped cab 15 for the work machine. Thus, when first plate members 110, 210 and second plate members 120, 220 on a side on which the operator riding inside cab 5 for the work machine sees work implement 4, i.e., on the right side in the right-left direction of cab 5 for the work machine, are arranged radially, the operator can visibly recognize work implement 4 more easily.

When at least two of the plurality of first plate members 110 and second plate members 220 are arranged radially, first plate member 110 or second plate member 220 is suppressed from obstructing the field of vision of the operator riding inside cab 5 for the work machine, and thus the effect of further widening the field of vision when the operator tries to look outside can be obtained. It is desirable to radially arrange all of first plate members 110 and second plate members 220 as in Embodiments 1, 2 described above, because the widest field of vision of the operator can be ensured.

Further, although the embodiments have described a configuration in which slits are formed on the front side of first plate members 110, slits are formed on the upper side of first plate members 210, and second plate members 120, 220 are fitted in the slits, the present invention is not limited to this configuration. It is only necessary that slits are formed in either the first plate members or the second plate members. For example, slits may be formed in second plate members 120, and first plate members 110 may be fitted in the slits. Further, for example, slits may be formed in second plate members 220, and first plate members 210 may be fitted in the slits.

A slit may have a shape cut from an end portion of a plate member on a side close to cab 5 for the work machine, instead of having a shape cut from an end portion of a plate member on a side away from cab 5 for the work machine. When a slit having a shape cut from an end portion of a plate member on a side away from cab 5 for the work machine is formed as in Embodiments 1, 2 described above, by designing the depth of the slit to be most suitable for the width of a plate member to be fitted in the slit, the first plate members and the second plate members can be arranged in an aligned manner on sides of front guard 100 and top guard 200 away from cab 5 for the work machine. This is desirable because protrusion of the first plate members or the second plate members can be prevented, and an operator protective guard excellent in design property can be achieved.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: hydraulic excavator; 2: travel base structure; 3: revolving superstructure; 4: work implement; 5: cab for work machine; 15: guard-equipped cab for work machine; 25: operator seat; 100: front guard; 110, 111 to 116, 210, 211 to 216: first plate member; 120, 121 to 124, 220, 221, 222: second plate member; 130, 230: frame; 141 to 146: fixed portion; 200: top guard; 1103, 1111 to 1114, 1121 to 1124, 1131 to 1134, 1141 to 1144, 1151 to 1154, 1161 to 1164: slit; 11030: open end; CL1, CL2: center line; DR1, DR3: first longitudinal direction; DR2: second longitudinal direction; EP: eye point.

The invention claimed is:

1. An operator protective guard, comprising:
a plurality of first plate members each made of one plate; and
a plurality of second plate members each made of one plate,
said plurality of the first plate members and said plurality of the second plate members being assembled in a grid pattern such that a first longitudinal direction of each of said plurality of the first plate members intersects with a second longitudinal direction of each of said plurality of the second plate members,
at least two of said plurality of the first plate members being arranged radially as seen in said first longitudinal direction,
at least two of said plurality of the second plate members being arranged radially as seen in said second longitudinal direction,
a slit being formed in only one of said first plate member and said second plate member, the other of said first late member and said second plate member not including any slits or depressions that correspond to the formed slit,
the other of said first plate member and said second plate member being fitted in said slit and fixed by welding, and
a dimension of said slit along the longitudinal direction of said one plate member is larger than a thickness of said other plate member fitted in said slit.

2. The operator protective guard according to claim 1, wherein said slit has a portion in which a dimension of said slit along the longitudinal direction of said one plate member increases up to an open end of said slit.

3. The operator protective guard according to claim 1, wherein said plurality of the first plate members are arranged symmetrically with respect to a plane intersecting with said second longitudinal direction.

4. The operator protective guard according to claim 1, wherein said plurality of the first plate members are provided in an even number.

5. The operator protective guard according to claim 1, wherein
said plurality of the second plate members include a plurality of one side plate members located on one side in said first longitudinal direction, and a plurality of the other side plate members located on the other side in said first longitudinal direction, and
an interval between said plurality of one side plate members is smaller than an interval between said plurality of the other side plate members.

6. The operator protective guard according to claim 1, further comprising a frame member surrounding said plurality of the first plate members and said plurality of the second plate members assembled in the grid pattern.

7. A guard-equipped cab for a work machine, comprising:
a cab for a work machine in which an operator operating the work machine rides; and
an operator protective guard as recited in claim 1 provided on at least one of a front side and a ceiling side of said cab for the work machine.

8. The guard-equipped cab for the work machine according to claim 7, wherein said first plate members are arranged symmetrically with respect to a center line of said cab for the work machine in a right-left direction of said cab for the work machine.

9. The guard-equipped cab for the work machine according to claim 7, further comprising an operator seat which is accommodated in an internal space of said cab for the work machine and in which said operator sits, wherein said first plate members are arranged symmetrically with respect to a center line of said operator seat in a right-left direction of said cab for the work machine.

10. A work machine, comprising a guard-equipped cab as recited in claim 7 provided on the work machine.

* * * * *